United States Patent
Blázquez-Sánchez

(10) Patent No.: US 11,673,207 B2
(45) Date of Patent: Jun. 13, 2023

(54) DEVICE AND METHODS FOR DETERMINING A FOCUS POSITION OF A LASER BEAM IN A LASER MACHINING SYSTEM

(71) Applicant: Precitec GmbH & Co. KG, Gaggenau (DE)

(72) Inventor: David Blázquez-Sánchez, Gaggenau (DE)

(73) Assignee: Precitec GmbH & Co. KG, Gaggenau (DE)

( * ) Notice: Subject to any disclaimer, the term of this patent is extended or adjusted under 35 U.S.C. 154(b) by 398 days.

(21) Appl. No.: 16/639,369

(22) PCT Filed: Feb. 20, 2019

(86) PCT No.: PCT/EP2019/054142
§ 371 (c)(1),
(2) Date: Feb. 14, 2020

(87) PCT Pub. No.: WO2019/170412
PCT Pub. Date: Sep. 12, 2019

(65) Prior Publication Data
US 2020/0254561 A1    Aug. 13, 2020

(30) Foreign Application Priority Data
Mar. 8, 2018   (DE) ..................... 10 2018 105 364.9

(51) Int. Cl.
| | | |
|---|---|---|
| *B23K 26/046* | (2014.01) | |
| *B23K 26/064* | (2014.01) | |
| *B23K 26/70* | (2014.01) | |

(52) U.S. Cl.
CPC .......... *B23K 26/046* (2013.01); *B23K 26/064* (2015.10); *B23K 26/705* (2015.10)

(58) Field of Classification Search
CPC .............. B23K 26/046; B23K 26/0648; B23K 26/38; B23K 26/0665; B23K 26/705;
(Continued)

(56) References Cited

U.S. PATENT DOCUMENTS

| | | | | |
|---|---|---|---|---|
| 5,815,626 A | * | 9/1998 | Kuba | ................. B23K 26/0648 385/38 |
| 6,501,061 B1 | | 12/2002 | Kitai et al. | |
| 2014/0042133 A1 | * | 2/2014 | Weick | ................... G01J 1/0414 219/121.81 |

FOREIGN PATENT DOCUMENTS

| | | |
|---|---|---|
| DE | 19630607 C1 | 10/1997 |
| DE | 102005016029 A1 | 10/2006 |
| DE | 102007039878 A1 | 5/2008 |
| DE | 102007053632 A1 | 5/2009 |
| DE | 102009007769 A1 | 8/2010 |
| DE | 102011007176 A1 | 10/2012 |
| DE | 102011054941 B3 | 1/2013 |

(Continued)

OTHER PUBLICATIONS

JP2008058793 (Year: 2008).*
International search report dated Jun. 6, 2019, International Application No. PCT/EP2019/054142.

*Primary Examiner* — Tu B Hoang
*Assistant Examiner* — Vy T Nguyen
(74) *Attorney, Agent, or Firm* — Dinsmore & Shohl LLP

(57) ABSTRACT

A device for determining a focus position of a laser beam in a laser machining system includes an optical element configured to reflect a portion of the laser beam for coupling out a first sub-beam of the laser beam, a spatially resolving sensor to which the first sub-beam can be directed, and an evaluation unit configured to determine a focus position of the laser beam based on an actual diameter of the first sub-beam incident on the spatially resolving sensor, a laser beam power, and calibration data.

3 Claims, 2 Drawing Sheets

(58) Field of Classification Search
CPC ............... B23K 26/032; B23K 26/064; B23K 26/707; B23K 26/0006; B23K 26/044; B23K 26/048; B23K 26/0643; B23K 26/0869; B23K 26/34; B23K 31/125; B23K 9/1274; B23K 26/382; G02B 19/0047; G02B 19/0014; G02B 19/0052; G02B 7/08; G02B 19/0009; G02B 7/28; G02B 7/36; G01J 1/0411; G01J 1/0414; G01J 1/4257; G01J 1/0448
USPC ............ 219/121.63, 121.45, 121.46, 121.64, 219/121.65, 121.66, 121.83; 356/301, 356/318, 328, 337, 4.01; 372/3, 70; 385/124, 123, 31, 33, 38
See application file for complete search history.

(56) References Cited

FOREIGN PATENT DOCUMENTS

| | | | |
|---|---|---|---|
| DE | 102015001466 A1 | 8/2015 |
| DE | 102015001421 A1 | 8/2016 |
| DE | 102015106618 A1 | 11/2016 |
| JP | H04-237587 A | 8/1992 |
| JP | 0751875 A | 2/1995 |
| JP | 2000094173 A | 4/2000 |
| JP | 2002542042 A | 12/2002 |
| JP | 2008119716 A | 5/2008 |
| JP | 2010179637 A | 8/2010 |
| JP | 201547612 A | 3/2015 |
| WO | 2015185152 A1 | 12/2015 |
| WO | 2017158737 A1 | 9/2017 |
| WO | 2019170412 A1 | 9/2019 |

\* cited by examiner

DEVICE AND METHODS FOR DETERMINING A FOCUS POSITION OF A LASER BEAM IN A LASER MACHINING SYSTEM

CROSS-REFERENCE TO RELATED APPLICATIONS

This application is the U.S. national stage of PCT/EP2019/054142 filed Feb. 20, 2019, which claims priority of German Patent Application 102018105364.9 filed Mar. 8, 2018 both of which are hereby incorporated by reference in their entirety.

FIELD OF INVENTION

The present disclosure relates to a device for determining a focus position of a laser beam in a laser machining system or a laser machining head, such as a cutting or welding head, a laser machining system including such a device and a method for determining a focus position of a laser beam in a laser machining system. In particular, the present disclosure relates to the determination and correction of a focus position of a machining laser beam in real time.

BACKGROUND OF THE INVENTION

In a device for machining material using laser, e.g. in a laser machining head, for example for laser welding or laser cutting, the laser beam exiting from a laser light source or an end of a laser fiber is focused or collimated onto the workpiece to be machined by means of a beam guiding and focusing optics. By default, a laser machining head is used with a collimator optics and a focusing optics, wherein the laser light is supplied via an optical fiber.

A problem in laser material machining is the so-called "thermal lens" due to the heating of optical elements for laser beam guiding and focusing by laser power, in particular in the multi-kilowatt range, and the temperature dependence of the refractive index of optical glasses. In laser material machining, the thermal lens results in a focus shift along the beam propagation direction, which may have a negative effect on the quality of machining.

During the laser material machining process, primarily two mechanisms lead to heating of the optical elements. On the one hand an increase in laser power and on the other hand soiling of the optical elements. Furthermore, it is possible for the optical elements to undergo mechanical deformation, which leads to a change in the refractive index. For example, the mechanical deformation may be caused by a thermal expansion of the socket of the optical elements.

In order to ensure high-quality laser machining, it is necessary to detect the respec-tive focus position and to compensate the focus position shift, i.e., to provide a fast and accurate focus position control.

A thermal lens not only leads to a focus shift, but also to a deterioration of beam quality, and may cause, for example, aberrations. This results in a change in the overall beam caustics, such as a focus diameter. The determination of the focus position by a sim-ple comparison with reference values is therefore imprecise. In particular, it cannot substi-tute measurement and control of the focus position in real time.

DE 10 2007 053 632 B4 describes a method for online beam analysis, characterized in that a defined percentage of a beam directed into a machining zone with focus beam is reflected back coaxially on a reflective surface of an optical element located perpendicular to the main beam, and this partial beam reflected back is separated from the main beam by a beam splitter, such that the partial beam reflected back is available for beam analysis during a machining process and the beam properties of the partial beam reflected back are analyzed.

SUMMARY OF THE INVENTION

It is an object of the present disclosure to provide a device for determining a focus position of a laser beam in a laser machining system, a laser machining system including such a device, and a method for determining a focus position of a laser beam in a laser machining system that can reliably determine a current focus position of a laser beam. In particular, it is an object of the present disclosure to determine and adjust a focus position of a laser beam in real time during a laser machining process.

This object is achieved by the subject matter disclosed herein. Advantageous embodiments of the invention are also disclosed.

According to embodiments of the present disclosure, a device for determining a focus position of a laser beam in a laser machining system is provided. The device comprises an optical element configured to reflect a portion of the laser beam for coupling out a first sub-beam of the laser beam, a spatially resolving sensor to which the first sub-beam is directable, and an evaluation unit configured to determine, based on an actual diameter of the first sub-beam incident on the spatially resolving sensor, a laser beam power and calibration data dependent on the laser beam power, a focus position of the laser beam. The optical element is arranged in the beam path of the laser beam.

According to further embodiments of the present disclosure, a device for determining a focus position of a laser beam in a laser machining system is provided. The device comprises an optical element configured to reflect a portion of the laser beam for coupling out a first sub-beam of the laser beam; a spatially resolving sensor for detecting an intensity distribution of the first sub-beam; and an evaluation unit configured to determine an actual diameter of the first sub-beam based on the detected intensity distribution, and to determine an actual focus position of the laser beam from the actual diameter, a laser beam power, and calibration data. The device may be configured for focus position control in real time.

Preferred optional embodiments and particular aspects of the disclosure will be apparent from, the drawings, and the present description.

According to the invention, the focus position is calculated in real time using a measured diameter of a back reflection, the instantaneous laser power, and power-depen-dent calibration data for the diameter. Based thereon, the focus position may be adjusted such that the focus position corresponds, for example, to a target focus position. The data of the spatially resolving sensor may also allow further diagnoses. For example, the power distribution is affected when an optics is very dirty, and then a hotspot may be recognizable on the spatially resolving sensor. Another possibility is to detect a misassembly of optical components (e.g., a lens screwed on wrongly) by comparing (target) power distributions or beam diameters for a particular laser power.

Preferably, the optical element is a transmissive optical element. The transmissive optical element may be config-ured to transmit a first portion of the laser beam and reflect at least one second portion of the laser beam. The second portion of the laser beam which is reflected, for example, by a surface of the element may form the first sub-beam. Thus, a portion of the laser beam, which may be a machining laser beam, is coupled out of the laser beam and used for determining the focus position of the laser beam.

According to embodiments, the optical element has a first surface and a second surface opposite the first surface, wherein the first surface is configured to reflect the first sub-beam and the second surface is configured to reflect a second sub-beam of the laser beam, and wherein the device is configured such that only the first sub-beam is directed onto the spatially resolving sensor. In other words, only a single back reflection of the optical element may be directed onto the spatially resolving sensor or only a single diameter may be used for determining the current focus position.

The second sub-beam may be eliminated in various ways. For this purpose, at least one surface of the optical element may have a coating for amplifying or reducing a reflection. In another example, the optical element may have a sufficient thickness for the reflections from both surfaces of the optical element to be reliably spatially separated such that only one back reflection hits the spatially resolving sensor. However, the present disclosure is not limited thereto and other ways of separating the two back reflections may be used, such as a beam splitter.

In some embodiments, the optical element is tilted with respect to an optical axis of the laser machining system. For example, the optical element may be tilted with respect to the optical axis by about 45° or less so that the first sub-beam or back reflection may be directed away from the beam path of the laser beam and towards the spatially resolving sensor. For example, the first sub-beam may be a back reflection of the last or rear surface (that is to say the side facing away from the spatially resolving sensor) of the optical element and may be able to be directed onto the spatially-resolving sensor with the aid of tilting.

According to some embodiments, the device comprises a power sensor configured to measure or determine the laser beam power of the laser beam. The power sensor may measure or determine the instantaneous or current laser beam power (also referred to as "laser power"). Alternatively, the device may comprise a data interface via which data relating to the current laser beam power can be received. In this case, the laser machining system may comprise the power sensor which can communicate with the device via the data interface in order to provide the data regarding the current laser beam power to the evaluation unit.

Typically, the evaluation unit is further configured to determine a target diameter of the first sub-beam based on the current laser beam power, a target focus position and the calibration data, which may be measured beam diameters as a function of the laser power. In other words, it can be determined how large the diameter of the sub-beam should be. By comparison with the actual diameter or by comparison of the target focus position with the actual focus position, a control of the focus position may be performed. For example, the control may be performed such that the actual diameter substantially corresponds to the target diameter, whereby the actual focus position substantially corresponds to the target focus position.

According to embodiments, the optical element may be arranged in a focus region of the laser beam. In particular, the optical element may be arranged between a focusing optics and a focus position (or a machining region of the laser beam, such as a workpiece).

Preferably, the optical element is a protective glass. The protective glass may be arranged on the output side of a laser machining system, such as a laser machining head. The protective glass may be provided to protect the (optical) elements within the laser machining system, and in particular the focusing optics, from soiling, e.g. caused by splashing or smoldering.

According to embodiments, the device may include an optical system for imaging the first sub-beam onto the spatially resolving sensor and/or at least one optical filter for the sub-beam and/or a deflection device for the sub-beam. The optical filter may optically filter the back reflections such that wavelengths or wavelength ranges suitable or optimal for detection reach the spatially resolving sensor. As a result, a background or noise in the sensor signal can be reduced, for example. The optical filter may also be configured to adjust a signal strength for the spatially resolving sensor. The deflection device may deflect the back reflection, for example, by means of one or more mirrors or one or more beam splitters such that the back reflection is directed onto the spatially resolving sensor.

According to another aspect of the present disclosure, a laser machining system is provided. The laser machining system comprises a laser device for providing a laser beam, a focusing optics for focusing the laser beam onto a workpiece, and the device described above for determining a focus position of a laser beam in a laser machining system. The laser machining system may be a laser cutting head or a laser welding head.

Preferably, the laser machining system comprises a collimator optics for collimating the laser beam provided by the laser device. In particular, the optical element of the device for determining a focus position may be arranged in a focus region of the focusing optics, that is to say in the beam path downstream of the focusing optics. In other words, the optical element of the device may be arranged on the beam output side downstream of the focusing optics.

According to embodiments of the present disclosure, a method for determining a focus position of a laser beam in a laser machining system is provided. The method comprises coupling out a back reflection of an optical element arranged in a beam path of the laser beam, determining a diameter of the back reflection, and determining a focus position of the laser beam based on an actual diameter of the back reflection, a laser beam power and calibration data.

According to further embodiments of the present disclosure, a method for determining a focus position of a laser beam in a laser machining system is provided. The method comprises coupling out a back reflection or a sub-beam of an optical element arranged in a beam path of the laser beam; detecting a spatially resolved intensity distribution of the back reflection; determining an actual diameter of the back reflection from the detected intensity distribution; and determining an actual focus position of the laser beam based on the actual diameter of the back reflection, a laser beam power and calibration data.

Preferably, the method comprises determining a target diameter of the back reflection of the laser beam based on a target focus position, the laser beam power and the calibration data. Determining the target diameter may further comprise an extrapolation or interpolation of the calibration data. Adjusting the focus position may be performed by comparing the actual diameter and the target diameter. For example, the focus position may be adjusted by a corresponding mechanism such that the measured diameter (i.e., the actual focus position) corresponds to the target diameter (i.e., the target focus position).

The method may comprise and implement the features and characteristics of the device for determining a focus position of a laser beam in a laser machining system and the laser machining system according to the embodiments described herein.

BRIEF DESCRIPTION OF THE DRAWINGS

Embodiments of the disclosure are illustrated in the figures and will be described in more detail below. In the figures.

DETAILED DESCRIPTION OF THE INVENTION

Figure 1:
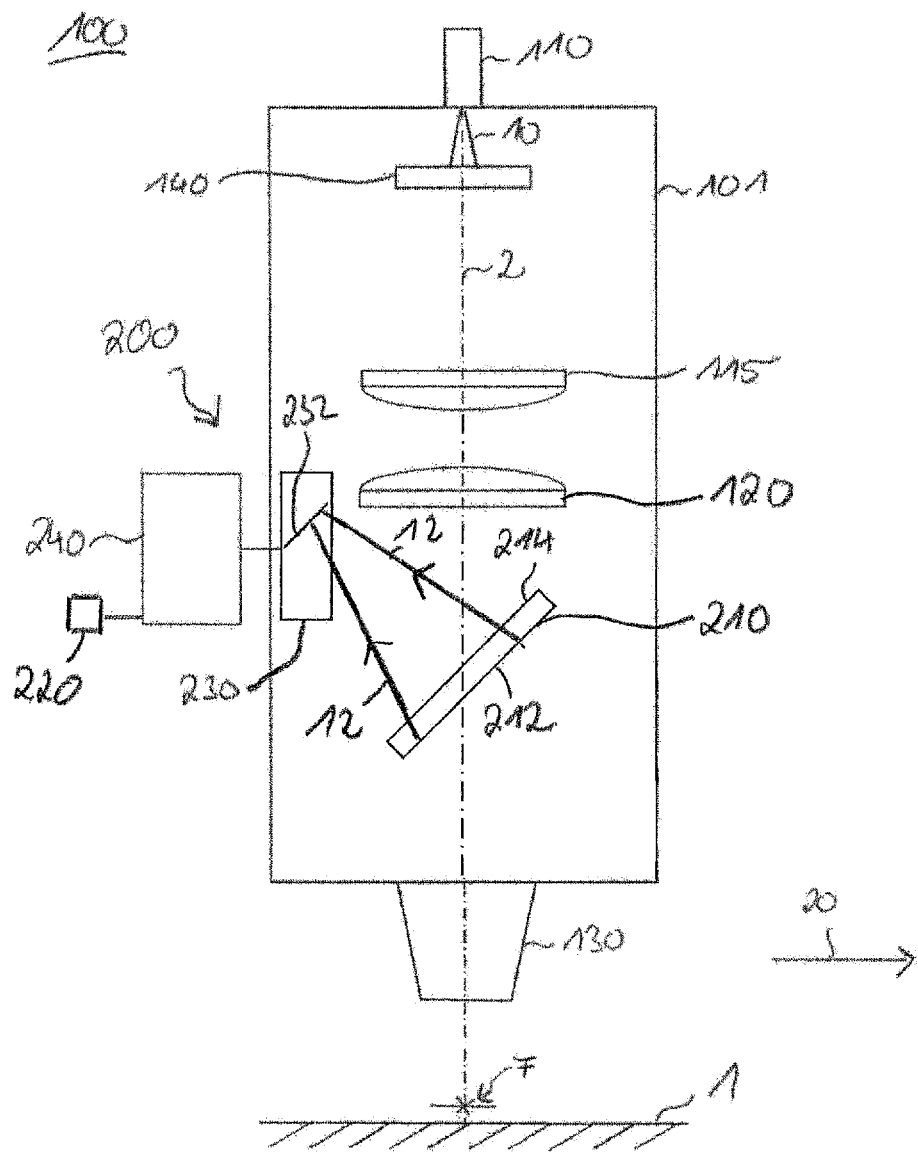
FIG. 1 shows a laser machining system with a device for determining a focus position of a laser beam in a laser machining system according to embodiments of the present disclosure.

In the following, unless otherwise noted, like reference numerals will be used for like and equivalent elements.

Figure 2:
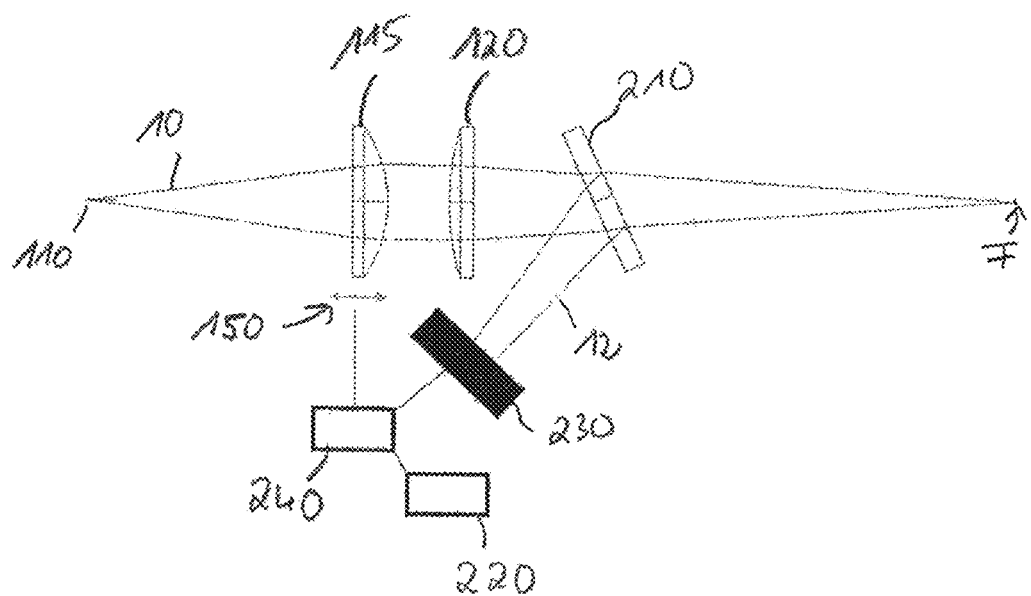
FIG. 2 shows a detail of the device for determining a focus position of a laser beam in a laser machining system as well as a collimator and focusing optics of the laser machining system according to embodiments of the present disclosure.

FIG. 1 shows a laser machining system 100 according to embodiments of the present disclosure. FIG. 2 shows a detail of the device 200 for determining the focus position F as well as a collimating and focusing optics 115, 120 of the laser machining system 100.

The laser machining system 100 may comprise a machining head 101, such as a cutting head or welding head, or be such a machining head 101. FIG. 1 shows, by way of example, a straight structure of the laser machining system 100 or of the beam path of the laser beam 10. It will be understood, however, that it is also possible to have an angled structure, e.g. at an angle of 90°. For the sake of clarity, the laser beam 10 is merely indi-cated in FIG. 1 and its beam path is not shown completely.

The laser machining system 100 comprises a laser device 110 for providing a laser beam 10 (also referred to as a "machining beam" or "machining laser beam"). The laser device 110 may comprise an optical fiber or be an optical fiber via which the laser beam 10 is supplied into the machining head 101. The laser machining system 100 may comprise a collimator optics 115, such as a collimator lens or a zoom system with a plurality of lenses, for collimating the laser beam 10. The laser beam 10 may propagate from the laser device 110 via an optional optical device 140, which may be a protective glass in front of the collimator optics, a lens or aperture, or a combination thereof, to the collimator optics 115.

Typically, the laser machining system 100 comprises a focusing optics 120, such as a focus lens, for focusing the laser beam 10 onto a workpiece 1. The collimator optics 115 and the focusing optics 120 may be integrated into the machining head 101. For example, the machining head 101 may comprise a collimator module which is integrated with the machining head 101 or mounted on the machining head 101.

According to embodiments, the laser machining system 100 or parts thereof, such as the machining head 101, may be movable along a machining direction 20. The machining direction 20 may be a welding direction and/or a moving direction of the laser machining system 100, such as the machining head 101, with respect to the workpiece 1. In particular, the machining direction 20 may be a horizontal direction. The machining direction 20 may also be referred to as "feed direction".

The laser machining system 100 or the laser machining head 101 comprises the device 200 for determining a focus position of the laser beam 10 according to the embodiments of the present disclosure. The device 200 shown in FIGS. 1 and 2 comprises at least one optical element 210 configured to reflect a part of the laser beam 10 for coupling out a first sub-beam 12 of the laser beam 10, a spatially resolving sensor 230 to which the first sub-beam 12 is directable, and an evaluation unit 240 configured to determine a focus position F of the laser beam 10 based on an actual diameter of the first sub-beam 12 incident on the spatially resolving sensor 230, a laser beam power and/or calibration data. Alternatively, the optical device 200 may comprise a plurality of optical elements, each of which couples out at least one sub-beam of the laser beam.

The optical element 210 is arranged in the beam path of the laser beam 10 and couples out a part of the laser beam 10, which forms the first sub-beam 12, from the laser beam 10. The optical element 210 may be arranged at an angle, such as an angle not equal to 90° or an angle of approximately 45°, to the optical axis or the laser beam propagation direction. As the optical element 210, a protective glass or the like may be provided. According to the invention, the current diameter of the first sub-beam 12 is measured, and the current focus position is determined using the current laser beam power and the calibration data. Thus, a focus position of the laser beam may be determined and corrected in real time (online). In particular, a system for laser material machining allowing for a focus position measurement in real time and thereby also a control of the focus position in real time in a structurally compact and modular manner may be provided.

The spatially resolving sensor 230 may be arranged such that the first sub-beam 12 is incident substantially perpendicularly on a sensor plane 232 of the spatially resolving sensor 230. For example, the sensor plane 232 of the spatially resolving sensor 230 may be oriented substantially in parallel to the optical element 210. Thus, a distortion of the diameter may be avoided. The cross section of the first sub-beam 12 may be substantially circular or annular, but is not limited thereto. The calibration data may be determined for any suitable shapes and diameters, such as circular shapes and/or oval shapes of the sub-beam. For non-circular shapes or non-oval shapes, a mean diameter can be calculated and used for example.

It is possible to use as a spatially resolving sensor 230 any sensor with which, for example, a diameter of the beam, i.e., the sub-beams, incident on the spatially resolving sensor 230 may be determined. For example, a camera, the sensor surface of which is formed, for example, by a CCD sensor, is used as a spatially resolving sensor 230. The sensor 230 may be configured to detect an intensity distribution of the incident sub-beam 12. From this, an evaluation unit may determine the current diameter of the sub-beam 12.

The focus position F of the laser beam 10 may be defined or specified substantially in parallel to an optical axis 2 of the laser machining system 100. In FIG. 1, the focus position F is shown, by way of example, above a surface of the workpiece 1. The laser machining system 100 may comprise a mechanism 150 for adjusting the focus position F according to embodiments. Based on the focus position F determined by the device 200, the mechanism 150 can adjust the focus position F. For example, the focus position F may be adjusted, for example, so as to correspond to a target focus position in a region of the workpiece 1, such as on a surface or within the workpiece 1. The mechanism 150 for adjusting the focus position F may comprise, for example, an actuator which displaces at least one optical element of the beam guiding optics, such as the collimator optics 115 and/or the focusing optics 120, for focus position control.

The optical element 210 of the device 200 may be arranged in a focus region of the focusing optics 120 that is in the beam path of the laser beam 10 following the focusing optics 120 or downstream of the focusing optics 120. In particular, the optical element 210 may be arranged between the focusing optics 120 and the focus position F. Typically, the optical element 210 is disposed between the focusing optics 120 and a beam nozzle 130 to protect the interior of the machining head 101, and in particular the focusing optics 120, from soiling.

In some embodiments, the optical element 210 is a transmissive optical element. The transmissive optical element may be configured to transmit a first portion of the laser beam 10 and reflect at least one second portion of the laser beam 10. The first portion of the laser beam 10 may be directed to the workpiece 1 for material machining. The second portion of the laser beam may be coupled out of the beam path and used for determining the focus position F of the laser beam 10. In other words, the sub-beams or back reflections of the laser beam 10 are coupled-out portions or beam portions of the laser beam 10, which is also referred to as "main beam".

Typically, the optical element 210 is made of glass, and may in particular be a protective glass. The protective glass may be arranged at the beam nozzle 130 on the beam outlet side. The protective glass may be provided to protect the (optical) elements within the laser machining system, and in particular the focusing optics 120, from soiling, e.g. caused by splashing or smoldering.

The optical element 210 has a first surface 212 and a second surface 214 opposite the first surface 212. The surfaces may be planar surfaces. Typically, the first surface 212 and the second surface 214 are substantially parallel to one another. The first sub-beam 12 may be reflected from the first surface 212 or the second surface 214. In particular, the first sub-beam 12 may be reflected from the first surface 212 of the optical element 210. The first surface 212 may be a surface that faces the beam exit side, that is, it may face the focus position F. In other words, the first surface 212 of the optical element 210 may be a surface facing away from the spatially resolving sensor 230 (e.g., a rear surface of the optical element 210).

According to embodiments, the first surface 212 is configured to reflect the first sub-beam 12 and the second surface is configured to reflect a second sub-beam (not shown) of the laser beam. The device 200 may be configured such that only the first sub-beam 12 is directed to the spatially resolving sensor 230. In other words, only a single back reflection may be directed to the spatially resolving sensor 230 or only a single diameter may be used to determine the focus position.

The second sub-beam may be eliminated in various ways. In one example, the optical element 210 may have a sufficient thickness such that the reflections from both surfaces of the optical element 210 may be reliably spatially separated so that only one back reflection is incident on the position-sensing sensor. Alternatively or additionally, the first and/or the second surface 212, 214 may also have a coating that amplifies or attenuates a reflection property. However, the present disclosure is not limited thereto, and other ways of separating the two back reflections may be used, such as a beam splitter or filter.

In some embodiments, the optical element 210 is tilted with respect to the optical axis 2 of the laser machining system 100. For example, the optical element 210 may be tilted with respect to the optical axis 2 by about 45° or less, so that the first sub-beam 12 or back reflection may be directed away from the beam path of the laser beam 10 and toward the spatially resolving sensor 230. However, the present disclosure is not limited thereto, and the optical element 210 may be oriented substantially perpendicular to the optical axis 2 of the laser machining system 100. In particular, the first surface 212 and the second surface 214 may be oriented substantially perpendicular to the optical axis 2. In such a case, the first sub-beam 12 may be directed towards the spatially resolving sensor 230 via a suitable deflection device, such as a beam splitter.

According to some embodiments, the device 200 comprises means for detecting the current laser beam power. The device 200 or the laser machining system 100 or laser machining head may, for example, comprise a power sensor 220 configured to measure or determine the laser beam power of the laser beam 10. The power sensor 220 may measure or determine the instantaneous or current laser beam power. Alternatively, the device 200 may comprise a data interface via which data relating to the current laser beam power can be received, for example, by the laser device 110 or a control of the laser machining system 100 or the laser machining head.

Typically, the evaluation unit 240 is further configured to determine a target diameter of the first sub-beam 12 based on the current laser beam power, a target focus position, and calibration data, which may be beam diameters measured as a function of the laser power. In other words, during the machining process it can be determined how large the diameter of the sub-beam would have to be for a given laser beam power and focus position. Furthermore, the evaluation unit 240 may be configured to determine a current focus position in real time using the calibration data and acquired or determined current or instantaneous data. This instantaneous data may include the instantaneous beam diameter determined based on the data of the spatially resolving sensor and instantaneous power data, either obtained by means of a power sensor 220 or provided via an interface. By comparing the target diameter with the actual diameter or the target focus position with the actual focus position, a control of the focus position may be performed. For example, the control may be performed such that the actual diameter substantially corresponds to the target diameter, resulting in the actual focus position substantially corresponding to the target focus position. These processes may be performed at least partially or completely during a laser machining process.

In some embodiments, device 200 may have an optics for imaging the back reflections, such as first sub-beam 12, onto the spatially resolving sensor 230. In further embodiments, the device 200 optionally comprises at least one optical filter for the back reflections, such as the first sub-beam 12. The optical filter may optically filter the back reflections such that wavelengths suitable or optimal for detection reach the spatially resolving sensor 230. In this way, background or noise in the sensor signal may be reduced, for example. The optical filter may also comprise a filter for adjusting a signal strength for the spatially resolving sensor 230, which may be an optical sensor.

Figure 3:
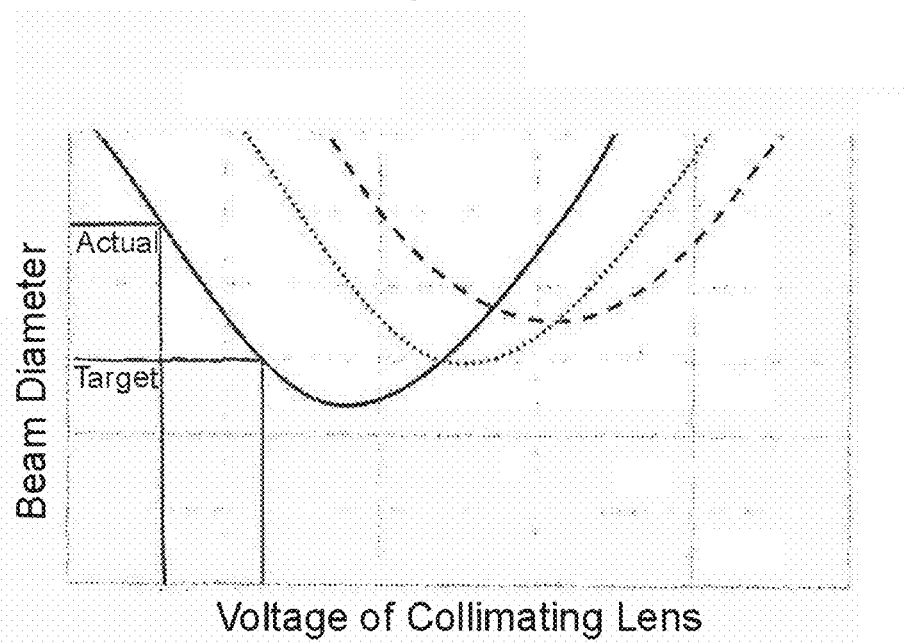
FIG. 3 shows calibration data used for determining the current focus position and the correction of the focus position according to the embodiments of the present disclosure.

FIG. 3 shows calibration data which may be used to determine the current focus position according to the embodiments of the present disclosure. In particular, calibration data at 1 kW (solid line) and 6 kW (dashed line) and calculated target diameters (dotted line) for a power L for 1 kW<L<6 kW are shown, which can be determined, for example, by interpolation. Alternatively, other algorithms may be used for interpolation or extrapolation. FIG. 3 shows the beam diameter as a function of a voltage value of the collimator optics. A representation as a function of the focus position, which can correlate with the collimator voltage, would also be possible. The influence of the laser power on the target diameter may be clearly seen, for example due to a deterioration in beam quality.

According to the present disclosure, the actual focus position of the laser beam may be determined based on an actual diameter of the back reflection or sub-beam 12, an actual laser beam power and the calibration data. In particular, the measured actual value of the diameter for the given laser power corresponds to an actual focus position (or a corresponding voltage value of the collimator lens).

In some embodiments, a target diameter of the back reflection of the laser beam may be calculated based on a target focus position, the laser beam power and the calibration data. With reference to FIG. 3, a target diameter of the back reflection results from the target focus position (or a corresponding voltage value of the collimator lens) for a given laser power. A deviation of the focus position may be determined by comparing the measured actual diameter (or the actual focus position) with the target diameter (or the target focus position). For example, the focus position may be changed by shifting the collimator optics such that the actual diameter corresponds to the target diameter and thus the actual focus position corresponds to the target focus position. This concept is robust even when the optics is soiled and still allows accurate focus position control in real time.

The calibration data may be measured or provided for a large number of laser power values. The calibration data may be interpolated or extrapolated in order to obtain calibration data for other laser power values.

According to the invention, the focus position may be calculated in real time using a measured diameter of a back reflection, the instantaneous laser power and power-dependent calibration data for the diameter. Based thereon, the focus position may be adjusted such that the focus position corresponds, for example, to a target focus position. The data of the spatially resolving sensor may also allow further diagnoses. For example, the power distribution is affected when an optics is considerably soiled, wherein a hotspot is recognizable on the spatially resolving sensor then. Another possibility is to detect a misassembly of optical components (e.g., a lens screwed on wrongly) by comparing (target) power distributions or beam diameters for a particular laser power.

The invention claimed is:

1. A method for controlling a focus position of a laser beam in a laser machining system, comprising:
    coupling out a back reflection of an optical element arranged in a beam path of said laser beam;
    detecting a spatially resolved intensity distribution of said back reflection;
    determining an actual diameter of said back reflection from the detected intensity distribution;
    providing a laser beam power of the laser beam;
    providing calibration data indicating laser beam diameter as a function of the laser beam power;
    determining an actual focus position of said laser beam based on the actual diameter of said back reflection, the laser beam power, and the calibration data;
    determining a target diameter of the back reflection of said laser beam based on a target focus position, the laser beam power, and the calibration data;
    comparing the actual diameter and the target diameter or the target focus position with the actual focus position; and
    adjusting the focus position based on the comparison such that the actual diameter corresponds to the target diameter.

2. The method according to claim 1, wherein determining the actual focus position or determining the target diameter further comprises extrapolation or interpolation of the calibration data.

3. The method according to claim 1, wherein the calibration data include beam diameters as a function of the laser beam power.

* * * * *